March 23, 1926.
T. V. HEMMINGSEN
1,577,968
JOINT BETWEEN WALLS SEPARATING TWO GASEOUS OR LIQUID FLUIDS UNDER PRESSURE
Filed Oct. 19, 1925
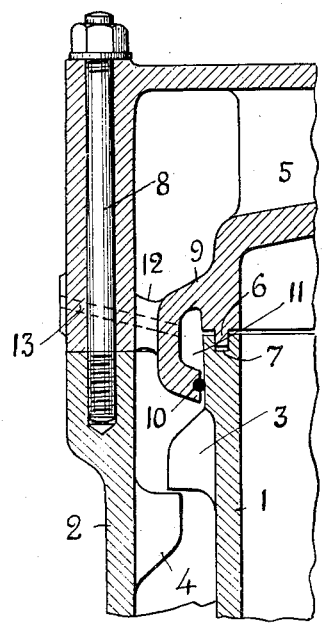
Inventor
T. V. Hemmingsen
by Langner, Parry, Card & Langner
Attys.

Patented Mar. 23, 1926.

1,577,968

UNITED STATES PATENT OFFICE.

TORKILD VALDEMAR HEMMINGSEN, OF COPENHAGEN, DENMARK.

JOINT BETWEEN WALLS SEPARATING TWO GASEOUS OR LIQUID FLUIDS UNDER PRESSURE.

Application filed October 19, 1925. Serial No. 63,566.

*To all whom it may concern:*

Be it known that I, TORKILD VALDEMAR HEMMINGSEN, a subject of the King of Denmark, and residing at Copenhagen, Denmark, have invented certain new and useful Improvements in Joints Between Walls Separating Two Gaseous or Liquid Fluids Under Pressure, of which the following is a specification.

This invention relates to an improvement in joints between walls separating two gaseous or liquid fluids under pressure, which joints are not under direct observation, and more specially it relates to such joints between the said walls where a cavity is placed between two packings one of which separates the cavity from one of the fluids in question, while the other separates the cavity from the other fluid, and in which one or more channels lead from the cavity to the atmosphere, whereby a leakage of the joint may be observed. If the fluids in question are of different kinds, the engineer will further be able to see which of the packings is out of order in these known joints, this being indicated by the gas or liquid leaking out through the channel or channels.

According to the invention this kind of joint is constructed in such a way that the cavity is formed by a flange projecting from the wall separating the two fluids, the free edge of said flange being tightened against that part of the wall from which it does not project, while both parts of the wall are assembled with each other and tightened by a suitable packing tightly pressed together, such as by a feather and recess. In this way there is obtained the combination of a rigid and slidable joint, so that in case of the tightness of the rigid joint not being maintained, e. g. owing to the pressure of one of the fluids, the slidable joint will not at the same time become leaky.

The joint in question will be applicable especially to the joint between the cylinder liner and the inner surface of the cylinder cover of internal combustion engines. In this case the joint is placed in a wall separating the motor gas from the cooling water circulating around the cylinder liner between the cooling jacket and the hollow cylinder cover.

The accompanying drawing represents a constructional form of the invention in connection with such a joint in a water cooled combustion motor, the figure showing a sectional elevation of the cylinder cover and cylinder of such a motor.

1 is the cylinder liner and 2 the water jacket of the cylinder. The liner may be carried by the jacket in various ways, for instance by projections 3 on the liner and 4 on the jacket, as shown, so as to provide for free passage of the cooling water to the hollow head 5 between the said projections. The inner wall of the cover is provided with a feather or rib 6 corresponding to a recess 7 in the liner. Thus the rib 6 and recess 7 form the rigidly tightened proper joint between the walls separating the two gaseous or liquid fluids under pressure (in this constructional form: motor gas and cooling water). The outer wall of the cylinder cover is also connected in a known manner with the inner wall by ribs or the like and tightened against the bottom of the recess 7 by a threaded bolt 8.

According to the invention a flange 9 projects from the wall separating the two gaseous or liquid fluids under pressure at one side of the joint 6, 7—in the constructional form shown in the drawing from the inner wall of the cylinder cover. The free edge of the flange 9 is tightened against the other side of the joint, in the constructional form shown in the drawing against the cylinder liner. This latter packing consists of a rubber ring 10, but may be effected by other means.

Thus the flange 9 forms a cavity 11 around the joint 6, 7. From the cavity 11 one or more channels 13 lead in a known manner to the atmosphere through one or more webs or projections 12 connecting the flange 9 with the outer wall of the cover. A leakage of the joint 6, 7 will cause combustion air or combustion gases to pass out through the channel 13 and a leakage of the packing 10 will cause cooling water to pass out, either leakage being indicated at the opening 13.

The invention is not limited to joints between the cylinder liner and cover of a combustion motor, but may be applied generally to joints between walls separating the gases or liquids under pressure.

I claim:

1. An improved joint for walls for separating two fluids under pressure from each other and from atmosphere comprising, a two part wall, a first connection joint between the two parts of the wall, a flange projecting from one wall part and having its free edge adjacent the other wall part to form a chamber enclosing the first joint, a packing between the free edge of the flange and the other wall part, and means connecting the interior of the chamber to atmosphere.

2. An improved joint for walls for separating two fluids under pressure from each other and from atmosphere comprising, two wall sections, a first joint connecting the sections, means integral with one section and jointed to the other section and shaped to form a chamber enclosing the first joint, and means connecting the interior of the chamber to atmosphere.

In testimony whereof I affix my signature.

TORKILD VALDEMAR HEMMINGSEN.